US007363807B2

(12) United States Patent
Schmidt

(10) Patent No.: US 7,363,807 B2
(45) Date of Patent: Apr. 29, 2008

(54) PUMP TESTING APPARATUS AND METHOD

(75) Inventor: Richard Schmidt, Islip Terrace, NY (US)

(73) Assignee: Sid Harvey Industries, Inc., Andrews, SC (US)

( * ) Notice: Subject to any disclaimer, the term of this patent is extended or adjusted under 35 U.S.C. 154(b) by 337 days.

(21) Appl. No.: 11/116,870

(22) Filed: Apr. 28, 2005

(65) Prior Publication Data

US 2005/0241370 A1 Nov. 3, 2005

Related U.S. Application Data

(60) Provisional application No. 60/566,151, filed on Apr. 28, 2004.

(51) Int. Cl.
*G01M 19/00* (2006.01)

(52) U.S. Cl. ........................................................ 73/168

(58) Field of Classification Search ..................... None
See application file for complete search history.

(56) References Cited

U.S. PATENT DOCUMENTS 4,800,931 A * 1/1989 Petkovsek .................... 141/65
5,723,777 A * 3/1998 Barone ........................ 73/116
5,857,500 A * 1/1999 Payne et al. .................. 141/59

OTHER PUBLICATIONS

"Tools & Testers p. 1", www.westwoodproducts.com/product_group_T1.htm, Apr. 2005.

"T20 Riello Pump Tester", www.westwoodproducts.com/t20.htm, Apr. 2005.

* cited by examiner

*Primary Examiner*—Robert Raevis
(74) *Attorney, Agent, or Firm*—Dilworth & Barrese, LLP.

(57) ABSTRACT

A pump testing apparatus includes a support structure having a first passageway having an inlet, an outlet, and an opening for receiving a pressure gauge, and a second passageway having an inlet, an outlet and an opening for receiving a vacuum gauge; a pressure gauge operatively connected with the opening of the first passageway; a vacuum gauge operatively connected with the opening of the second passageway; first valve means for controlling the flow of fuel from the inlet to the outlet of the first passageway; and second valve means for controlling the flow of fuel from the inlet to the outlet of the second passageway.

10 Claims, 7 Drawing Sheets

PUMP TESTING APPARATUS AND METHOD

CROSS-REFERENCE TO RELATED APPLICATIONS

The present application claims priority to U.S. provisional application Ser. No. 60/566,151 filed Apr. 28, 2004, which is herein incorporated by reference.

BACKGROUND

1. Field of the Invention

The present invention relates to testing equipment, and more particularly to an apparatus for testing pumps such as fuel pumps.

2. Background of the Art

Fuel oil burners are commonly used in residential and commercial buildings for providing heat and hot water. Typically, such burners employ a fuel injection system which includes a fuel pump, injector, fuel lines, and a reservoir for fuel. The fuel pump delivers fuel oil to the injector typically at a pressure of above about 80 psi, more typically above about 140 psi. The injector delivers a spray of fuel into the combustion chamber of the furnace and an ignitor ignites the fuel when the furnace is turned on.

Fuel pumps need to be periodically tested to make sure the pump is capable of maintaining the pressure necessary to keep the fuel properly atomized. To test the ability of the pump to maintain pressure a pump tester is typically used. The pump tester is connected to the output of the pump and usually includes a pressure gauge for measuring the pressure. Optionally, a valve can be included to bleed off fuel oil. Bleeding off oil tends to release pressure, which tests the ability of the pump to maintain pressure.

While various pump testers are available, they are specifically designed for certain brands of pumps. What is needed is a pump testing assembly which is conveniently used for any type of commercially available pump equipment and which enables a full range of testing not only for pressure, but vacuum, or suction, as well.

SUMMARY

A pump testing apparatus is provided herein. The apparatus comprises (a) a support structure having a first passageway having an inlet, an outlet, and an opening for receiving a pressure gauge, and a second passageway having an inlet, an outlet and an opening for receiving a vacuum gauge; (b) a pressure gauge operatively connected with the opening of the first passageway; (c) a vacuum gauge operatively connected with the opening of the second passageway; (d) first valve means for controlling the flow of fuel from the inlet to the outlet of the first passageway; and (e) second valve means for controlling the flow of fuel from the inlet to the outlet of the second passageway.

Also provided herein are a pump testing kit and a method for testing a pump. The apparatus advantageously incorporates a number of features to facilitate testing of fuel oil pumps for servicing residential and industrial oil burners.

BRIEF DESCRIPTION OF THE DRAWINGS

Various embodiments are described below with reference to the drawings wherein.

DETAILED DESCRIPTION OF PREFERRED EMBODIMENT(S)

Figure 1:
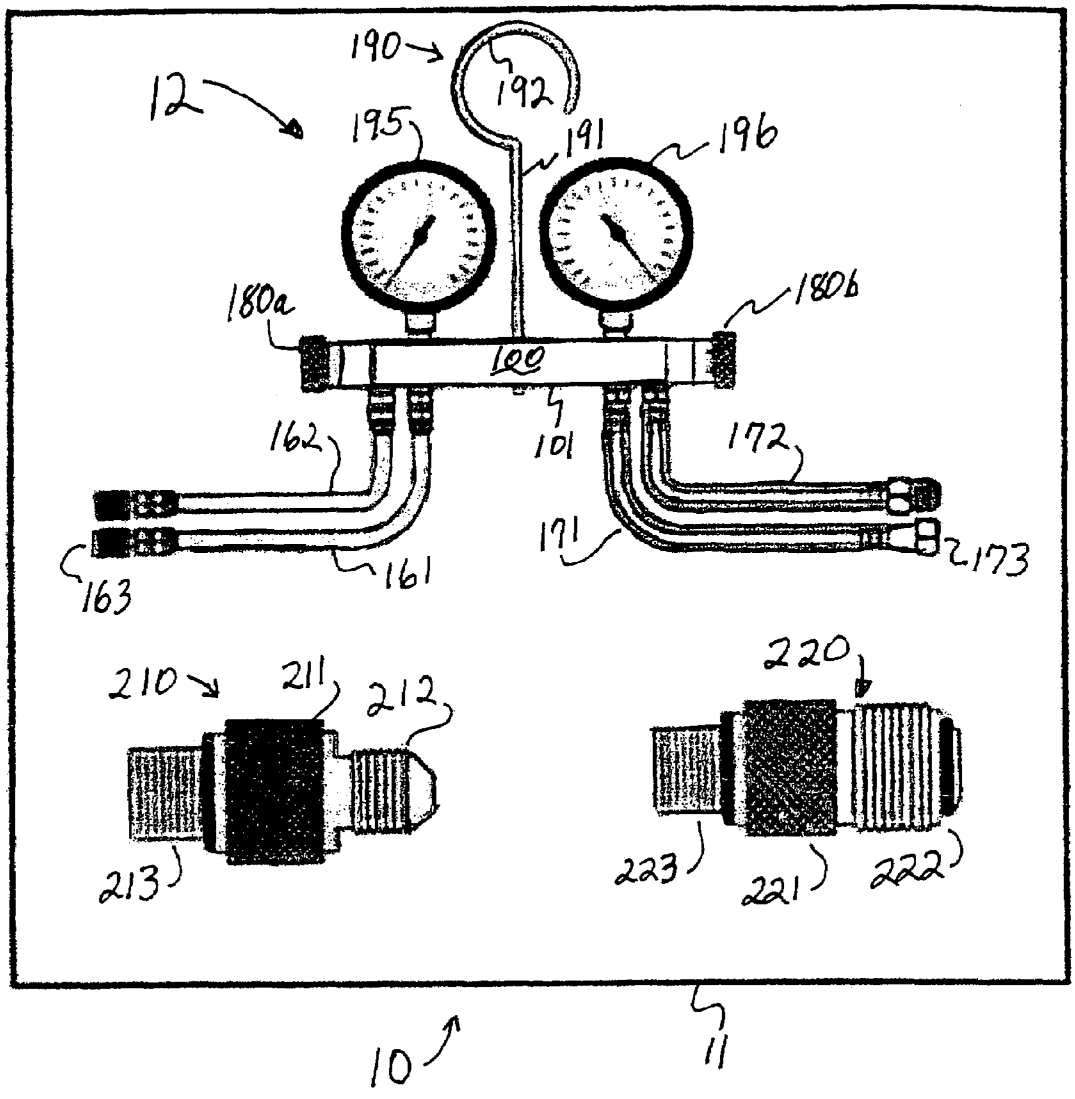
FIG. 1 is an illustration of a kit containing the pump testing apparatus of the invention and associated adapters.

Referring now to FIG. 1 a pump testing kit 10 is illustrated which includes a container 11, a pump testing assembly 12 and at least a pressure line adapter 210 and a vacuum line adapter 220. Various other adapters can also be included, such as pressure flare fitting adapters and vacuum fitting adapters, as described below.

The pump testing assembly 12 includes a pump testing manifold 100 with valves **180*a* and 180*b*, high pressure lines 161 and 162 and vacuum lines 171 and 172 connected to the manifold 100, a pressure gauge 195, vacuum gauge 196, and handle 190**.

Figure 2:
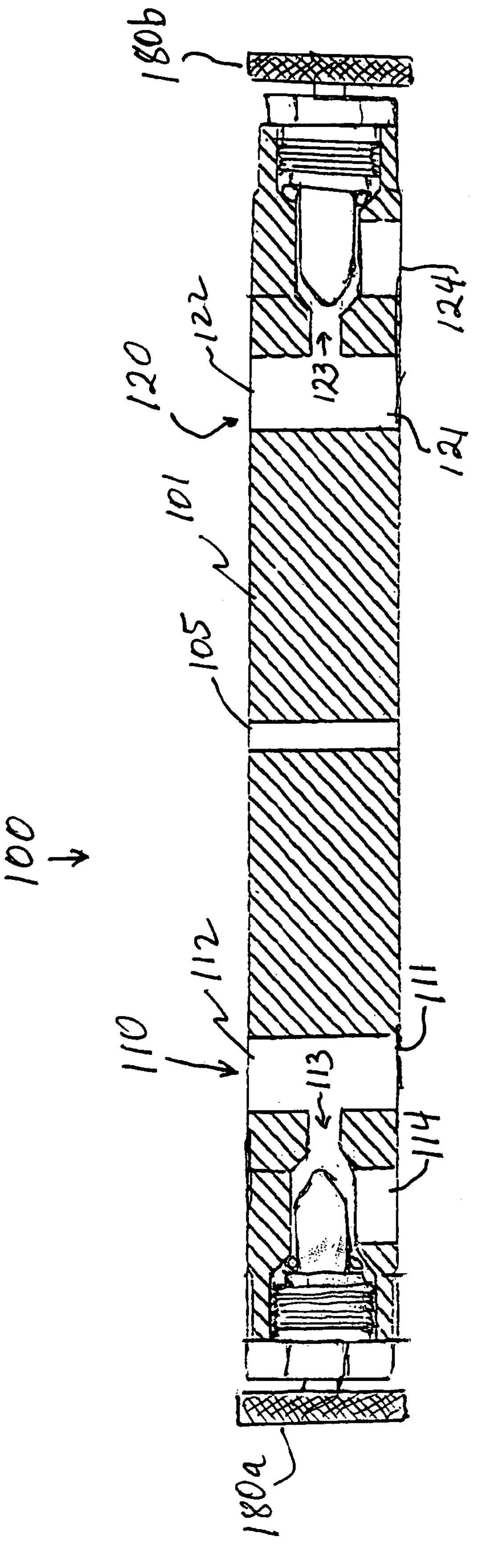
FIG. 2 is a sectional view of a pump testing manifold.

Referring also now to FIG. 2, pump testing manifold 100 includes a support structure, manifold body 101, fabricated as an elongated single piece from any appropriate metal capable of withstanding the pressures commonly encountered with pump testing, such as stainless steel, aluminum, brass, and the like. An aperture 105 extends through the center of the body 101 for receiving handle 190. Apertures 110 and 120 extend through the body 101. Aperture 110 has an upper opening 112 into which the pressure gauge 195 is received and a lower opening 111 into which one end of high pressure line 161 is received. High pressure lines 161 and 162 are fabricated from any flexible material which is capable of withstanding pressures at least up to 300 psi. Engineering plastics of suitable flexibility and strength are known and commercially available. Optionally, pressure lines 161 and 162 are color coded. For example, one line can be colored red and the other line yellow. The other end 163 of the high pressure line 161 is connected to the outlet of the oil pump (not shown). Oil received by the high pressure line 161 is conducted up into aperture 110 and the pressure of the oil is measured by gauge 195. Depending upon whether valve **180*a* is in the open position, the oil is allowed to flow through passageway 113 and through outlet 114. One end of high pressure line 162 is connected to outlet 114 of the manifold body 101. The other end of high pressure line 162 is preferably connected to the oil burner (see FIG. 7**) so as to conduct fuel oil to the fuel oil spray nozzle in the combustion chamber of the furnace.

Aperture 120 has an upper opening 122 into which the vacuum gauge 196 is received and a lower opening 121 into which one end of vacuum line 171 is received. Vacuum lines 171 and 172 are preferably fabricated from a clear plastic of suitable strength and flexibility so that the oil flowing therethrough can be visually inspected, for example, for air bubbles, debris, etc. The other end 173 of the vacuum line 171 is connected to pump inlet, or vacuum port of the oil pump (not shown). The vacuum is measured by gauge 196. One end of vacuum line 172 is connected to opening 124 of the manifold body 101. The other end of vacuum line 172 is connected to an oil supply. Depending upon whether valve **180*b* is in the open position, the oil from the supply is drawn into inlet opening 124 and is allowed to flow through passageway 123, through outlet opening 121 and into line 171** to the oil pump inlet.

Figure 3:
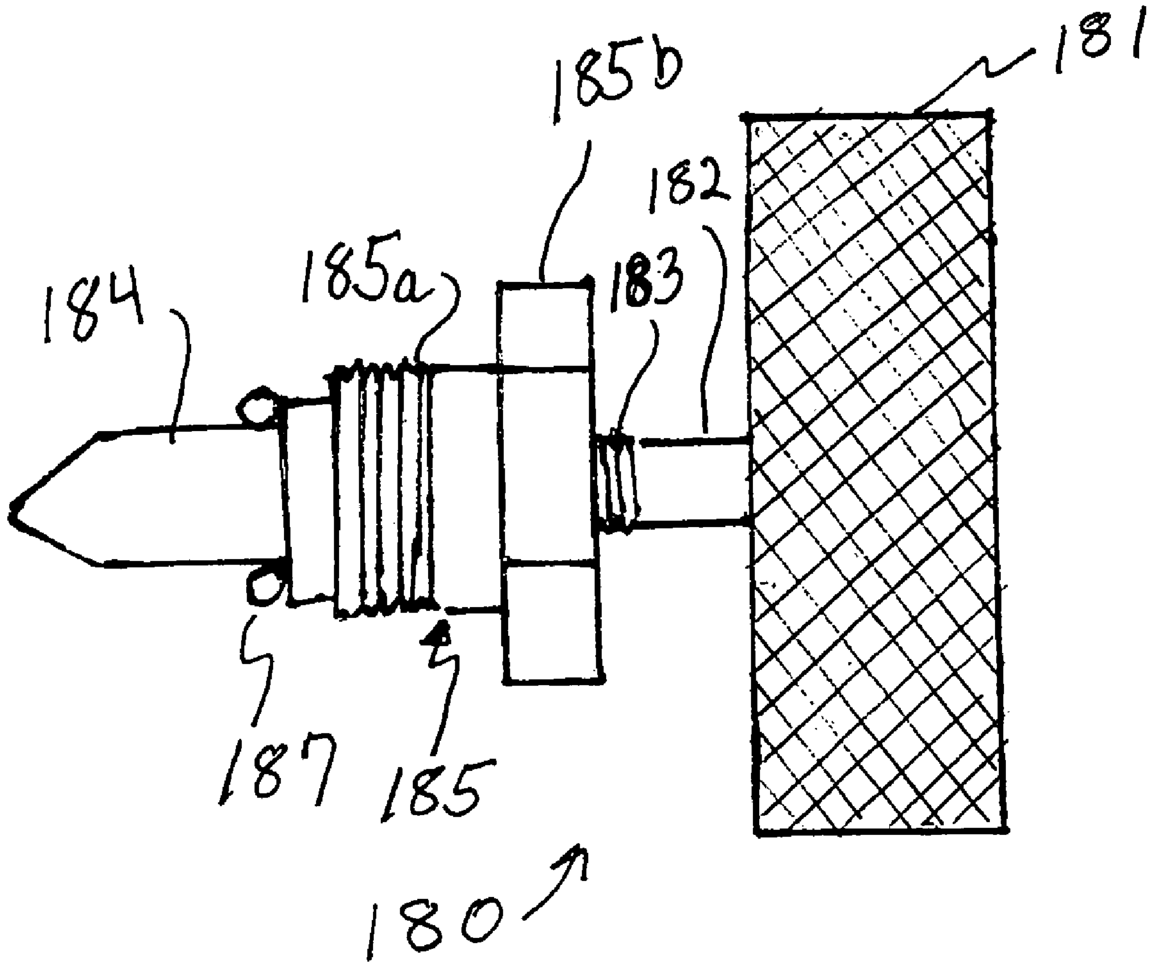
FIG. 3 is an illustration of a valve assembly which is mounted to the manifold body.

Referring now to FIG. 3, valve 180 (depicted as valves 180*a* and 180*b* in FIG. 2) is shown in more detail, wherein a valve body 185 having threaded portion 185*a* and hex nut head portion 185*b* is screw mounted to the end portion of the manifold body 101, one valve for each end portion. Knurled knob 181 is connected to a shaft 182 which is screw mounted by threaded portion 183 to the valve body 185. The opposite end of the shaft 182 includes a tapered tip 184 which engages a valve seat when the valve 180 is in the closed configuration to block the passage of fuel through passageways 113 or 123. The valve 180 is opened or closed by manually turning knurled knob 181. O-ring 187 helps to provide a secure seal.

Figure 4:
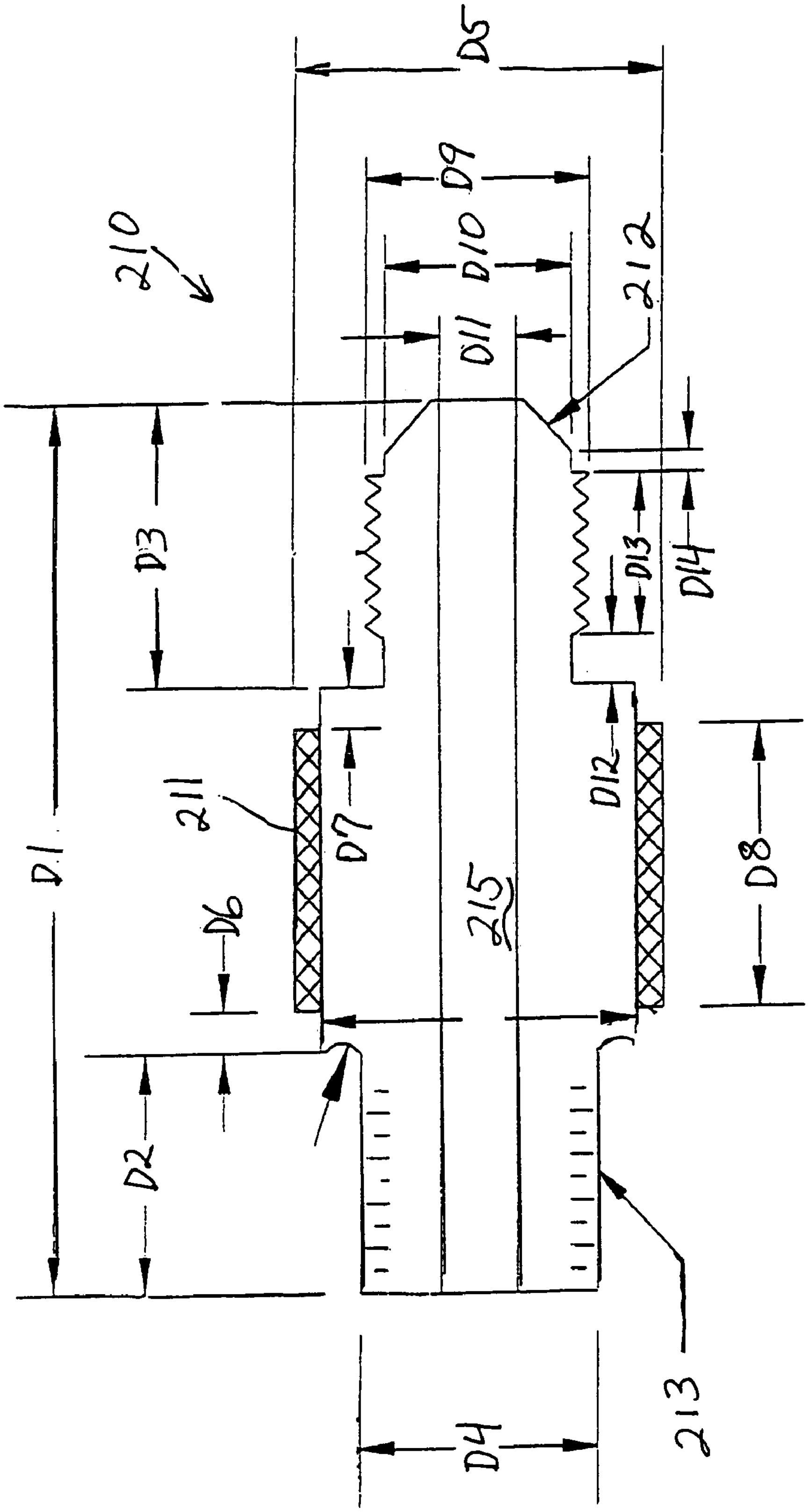
FIG. 4 is an illustration of a pressure line adapter.

Referring now to FIGS. 1 and 4, pressure adapter 210 is fabricated from any suitable metal and is preferably a single piece construction including a knurled middle portion 211 a threaded end portion 212 which is adapted to engage end 163 of the pressure line 161, and an opposite threaded end portion 213 which is adapted to engage the outlet of a commonly available type of oil pump. Bore 215 permits the passage of oil therethrough. The preferred dimensions of pressure adapter 210, within a tolerance of ±0.001 inches are set forth below in Table 1.

TABLE 1

| Dimensions in inches | |
|---|---|
| D1 | 1.275 |
| D2 | 0.275 |
| D3 | 0.4375 |
| D4 | 0.395 |
| D5 | 0.625 |
| D6 | 0.062 |
| D7 | 0.062 |
| D8 | 0.437 |
| D9 | 0.375 |
| D10 | 0.312 |
| D11 | 0.125 |
| D12 | 0.075 |
| D13 | 0.250 |
| D14 | 0.032 |

Figure 5:
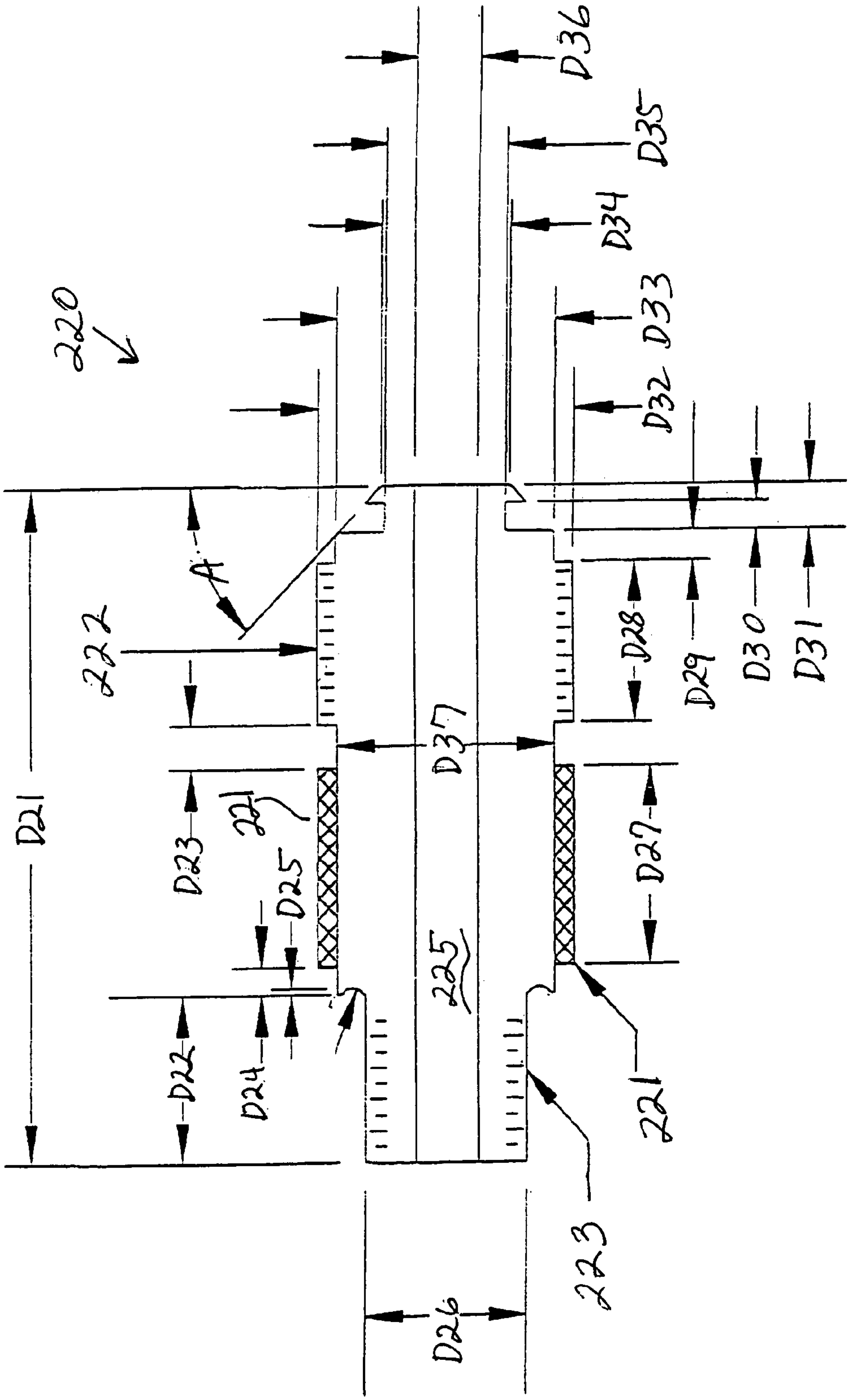
FIG. 5 is an illustration of a vacuum line adapter.

Referring now to FIGS. 1 and 5, vacuum adapter 220 is fabricated from any suitable metal and is also preferably a single piece construction including a knurled middle portion 221 a threaded end portion 222 which is adapted to engage end 173 of the vacuum line 171, and an opposite threaded end portion 223 which is adapted to engage the inlet of a commonly available type of oil pump. Angle A is preferably from about 30° to about 60°, more preferably from about 40° to about 50°, and most preferably about 45°. The preferred dimensions of pressure adapter 220, within a tolerance of ±0.001 inches are set forth below in Table 2.

TABLE 2

| Dimensions in inches | |
|---|---|
| D21 | 1.500 |
| D22 | 0.375 |
| D23 | 0.095 |
| D24 | 0.062 |
| D25 | 0.015 |
| D26 | 0.395 |
| D27 | 0.437 |
| D28 | 0.360 |
| D29 | 0.070 |
| D30 | 0.062 |
| D31 | 0.100 |
| D32 | 0.625 |
| D33 | 0.535 |

TABLE 2-continued

| Dimensions in inches | |
|---|---|
| D34 | 0.320 |
| D35 | 0.300 |
| D36 | 0.156 |

Referring now to FIG. 1, pressure gauge 195 and vacuum gauge 196 are commercially available types of gauges and are preferably fluid filled to prevent pressure shocks. Handle 190 is preferably an elongated member having a rectilinear portion 191 and an arcuate hook portion 192 which facilitates carrying, or hanging the pump testing manifold 100 on any convenient support.

Figure 6:
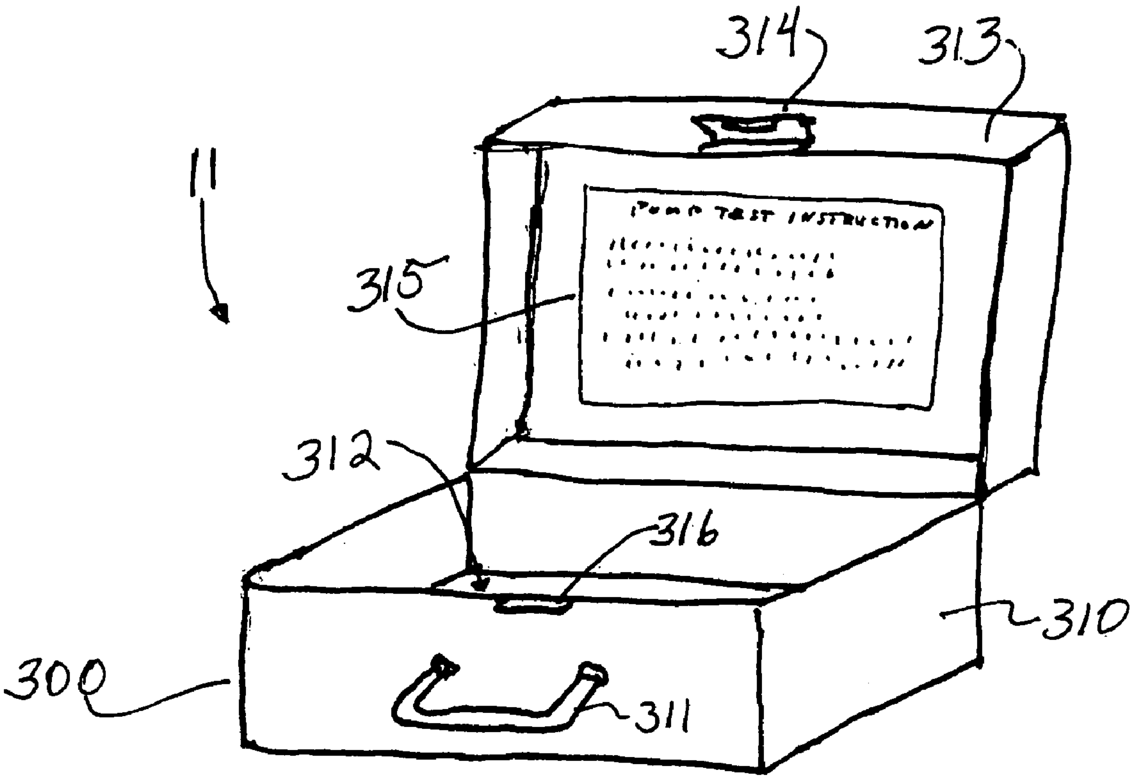
FIG. 6 is a perspective view of a container for the kit of FIG. 1.

Referring now to FIG. 6, container 11 comprises carrying case 300 which includes a cargo portion 310 for holding the pump testing equipment described above, and a cover 313 hingedly attached to the cargo portion 310. A foam pad 312 is preferably placed at the bottom of cargo portion 310 to resist jostling of the container contents which might cause damage. A handle 311 is attached to the cargo portion 310 to facilitate carrying of the container. Cover 313 preferably includes a latch 314 for engaging corresponding latch 316 on the cargo portion 310 to securely close the cover 313. Preferably, a sheet of instructions 315 is affixed to the inside of the cover 313.

Figure 7:
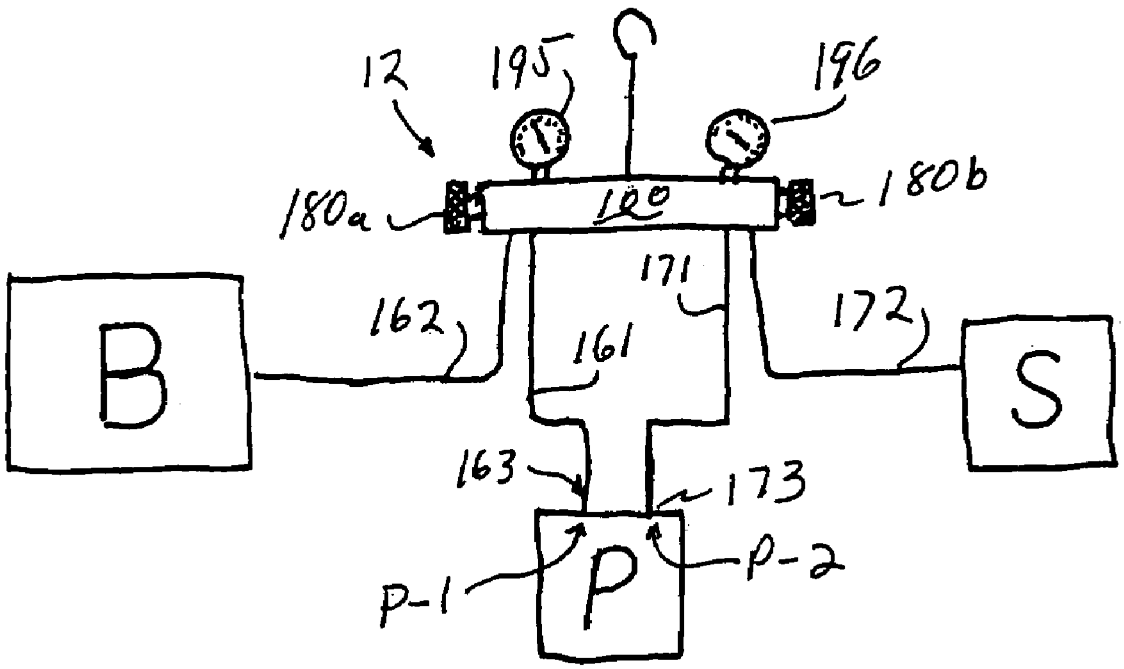
FIG. 7 is a diagrammatic view illustrating a set-up for testing a pump.

A suitable procedure for testing the fuel oil pump using the invention is set forth herein with reference to FIG. 7:

Pressure Check

1. Pressure line 161 is connected to the pump outlet P-1 of pump P. Pressure line 162 is connected to the drawer assembly of oil burner B. Appropriate adapters mounted to the end portion 163 can be used to make the connection between pressure line 161 and the pump outlet of any of a variety of commercially available pumps.

2. The pressure valve 180*a* is initially opened and the pump pressure is tested by gradually increasing the pressure adjuster on the pump. If the pump pressure drops off before a maximum pressure is reached, the pump P is defective. If the maximum pressure is maintained pump P is in good condition. The present invention can accommodate pressures at least as high as 300 psig.

3. If the pump P passes this test, it is adjusted until the desired operating pressure is reached as indicated by pressure gauge 195.

4. To check pressure cutoff, with the burner running valve 180*a* is closed. Then the burner is shut off and the pressure gauge 195 is read. The pump P is defective if the pressure drops and does not hold. The pump P is in good condition if the pressure drops approximately 25 psig and holds steady.

Vacuum Check

Vacuum line 171 is connected to inlet P-2 of pump P. Vacuum line 172 is connected to an oil supply. When valve 180*b* is in the open position oil flow through transparent lines 171 and 172 can be visually monitored when the pump is operating to check for dirt, air bubbles, oil leaks, and clogged, kinked or frozen lines. Valve 180*b* can be closed to obtain a reading on the vacuum gauge 196 to check the vacuum drawn by the pump P. Appropriate adapters mounted to the end portion 173 can be used to make the connection between vacuum line 171 and the pump inlet of any of a variety of commercially available pumps.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A pump testing kit comprising:

a) a support structure having a first passageway having an inlet, an outlet, and an opening for receiving a pressure gauge, and a second passageway having an inlet, an outlet and an opening for receiving a vacuum gauge;

b) a pressure gauge operatively connected with the opening of the first passageway;

c) a vacuum gauge operatively connected with the opening of the second passageway;

d) first valve means for controlling the flow of fuel from the inlet to the outlet of the first passageway;

e) second valve means for controlling the flow of fuel from the inlet to the outlet of the second passageway;

f) first and second pressure lines, each line having an end, each end being connected respectively to the inlet and outlet of the first passageway for conveying fuel from a pump outlet through the first passageway and to a furnace;

g) first and second vacuum lines connected respectively at one end to the inlet and outlet of the second passageway for conveying fuel from a fuel supply through the second passageway and to the inlet of the pump; and h) a plurality of interchangeable adapters for connecting the pressure lines and vacuum lines to different types of pumps.

2. The kit of claim 1 further including a handle attached to the support structure.

3. The kit of claim 1 wherein the pressure lines are color coded.

4. The kit of claim 1 wherein the vacuum limes are transparent.

5. A kit for testing a fuel oil pump, which comprises:

a) a container having an interior space and a cover;

b) a pump testing assembly comprising, i) a support structure having a first passageway having an inlet, an outlet, and an opening for receiving a pressure gauge, and a second passageway having an inlet, an outlet and an opening for receiving a vacuum gauge, ii) a pressure gauge operatively connected with the opening of the first passageway, iii) a vacuum gauge operatively connected with the opening of the second passageway, iv) first valve means for controlling the flow of fuel from the inlet to the outlet of the first passageway, and v) second valve means for controlling the flow of fuel from the inlet to the outlet of the second passageway;

vi) first and second pressure lines connected respectively at one end to the inlet and outlet of the first passageway for conveying fuel from a pump outlet through the first passageway and to a furnace;

vii) first and second vacuum lines connected respectively at one end to the inlet and outlet of the second passageway for conveying fuel from a fuel supply through the second passageway and to the inlet of the pump; and, c) a plurality of interchangeable adapters for connecting the pressure lines and vacuum lines to different types of pumps.

6. The kit of claim 5 wherein the pressure lines are color coded.

7. The kit of claim 5 wherein the pressure lines are capable of withstanding pressures of up to at least about 300 psig.

8. The kit of claim 5 wherein the vacuum lines are transparent.

9. A method for testing a pump comprising the steps of:

a) providing a pump testing kit including, i) a pump testing assembly comprising, a support structure having a first passageway having an inlet, an outlet, and an opening for receiving a pressure gauge, and a second passageway having an inlet, an outlet and an opening for receiving a vacuum gauge, a pressure gauge operatively connected with the opening of the first passageway, a vacuum gauge operatively connected with the opening of the second passageway, first valve means for controlling the flow of fuel from the inlet to the outlet of the first passageway, and second valve means for controlling the flow of fuel from the inlet to the outlet of the second passageway;

ii) first and second pressure lines connected respectively at one end to the inlet and outlet of the first passageway for conveying fuel from a pump outlet through the first passageway and to a furnace;

iii) first and second transparent vacuum lines connected respectively at one end to the inlet and outlet of the second passageway for conveying fuel from a fuel supply through the second passageway and to the inlet of the pump; and, iv) a plurality of interchangeable adapters for connecting the pressure lines and vacuum lines to different types of pumps;

b) connecting the second vacuum line to an inlet of a pump to be tested and the first vacuum line to the outlet of the fuel supply;

c) with the second valve in an open position and the pump in operation, observing the oil flowing through the vacuum lines;

d) closing the second valve and observing the vacuum gauge.

10. The method of claim 9 further including the steps of:

connecting the first pressure line to an outlet of the pump and the second pressure line to a drawer assembly of the furnace;

gradually closing the first valve and observing the pressure gauge for drop in pressure.

* * * * *